United States Patent [19]

Stolarz

[11] Patent Number: 6,156,352

[45] Date of Patent: Dec. 5, 2000

[54] METHOD AND MEANS FOR HUSBANDING MARINE ORGANISMS

[76] Inventor: Edward S. Stolarz, 34 Ray Hill Rd., P.O. Box 242, East Haddam, Conn. 06423

[21] Appl. No.: 09/316,730

[22] Filed: May 21, 1999

Related U.S. Application Data

[63] Continuation-in-part of application No. 09/059,939, Apr. 14, 1998, abandoned
[60] Provisional application No. 60/043,584, Apr. 12, 1997.

[51] Int. Cl.$^7$ ..................................................... A01K 61/02
[52] U.S. Cl. ............................. 426/2; 426/74; 426/293; 426/289; 426/297; 426/805; 119/230
[58] Field of Search .................... 426/2, 805, 297, 426/289, 293, 74; 119/230

[56] References Cited

U.S. PATENT DOCUMENTS

| | | | |
|---|---|---|---|
| 3,686,372 | 8/1972 | Hiatt et al. ............................ | 263/53 R |
| 3,903,304 | 9/1975 | Groninger, Jr. et al. .................... | 426/1 |
| 4,710,407 | 12/1987 | Keeton ................................. | 427/389.9 |
| 4,809,455 | 3/1989 | Smart ......................................... | 43/4.5 |
| 5,514,408 | 5/1996 | Lan et al. ................................. | 426/656 |
| 5,593,978 | 1/1997 | Jacobs et al. ............................. | 514/58 |

FOREIGN PATENT DOCUMENTS 2572625   5/1986   France .

*Primary Examiner*—Chhaya D. Sayala

[57] ABSTRACT

A method and means for enhancing, encouraging and facilitating the growth of various species of marine life in an aqueous environment uses a nutrient mix derived from chemicals such as calcium carbonate and refined lanolin. When placed upon organic substrate support materials such as corn cobs and/or oyster shells and submerged in the presence of certain temperate zone climatic conditions, resulting marine life may be harvested for further commercial utilization or it may be allowed to remain in situ for "natural" utilization such as, for example, attracting ducks, geese and/or other species of waterfowl to a marine habitat.

18 Claims, 1 Drawing Sheet

METHOD AND MEANS FOR HUSBANDING MARINE ORGANISMS

This application is a continuation-in-part of Applicant's prior non-provisional application Serial No.09/059,939, filed Apr. 14, 1995 abandoned, which, in turn, is based upon Applicant's prior provisional Application Serial No., 60/043,584 filed Apr. 12, 1997.

BACKGROUND OF THE INVENTION

This invention relates generally to husbanding the growth of marine organisms in an aqueous medium for the purpose of using either the organisms themselves or the different life forms that flourish in their presence. More particularly, this invention relates to a method and means for encouraging the growth of various species of marine organisms by enhancing the nutritional characteristics of the environment in which the organisms evolve, and mechanically facilitating such growth. Stimulation of natural growth of marine organisms in response to alteration of the nutrient level of an aqueous; medium is disclosed in the prior art. However, this invention goes beyond the prior art to disclose that particular menus of nutrient materials comprising mixtures of selected minerals derived from hydrated oyster shell powder, and selected chemical compounds from the group comprising fish oil, refined lanolin and vegetable oils such as linseed oil, prepared and presented in accordance with the discoveries of this invention, will help to advance the evolution of various species of marine organisms in a natural aqueous medium.

Accordingly, it is an object of this invention to selectively enhance the growth of marine organisms in an aqueous medium, so as to attract predator and parasite forms of life that feed naturally upon the marine organisms that are thus grown.

It is a still further object of this invention to selectively enhance the growth of marine organisms through the derivation of mineral nutrients from processed sea shells.

Another and still further object of this invention is the derivation of calcium carbonate and other minerals for use in accordance with this invention, through the processing of oyster shells.

Still another and further object of this invention is the enhancement of the growth of marine organisms through the use of selected chemical compounds derived from refined lanolin or vegetable sources.

These and other and further objects, features and advantages of this invention will be made obvious to those having skill in this art, by reference to the following description and claims, and the accompanying drawings, in which:

DETAILED DESCRIPTION OF THE DRAWINGS

Figure 1:
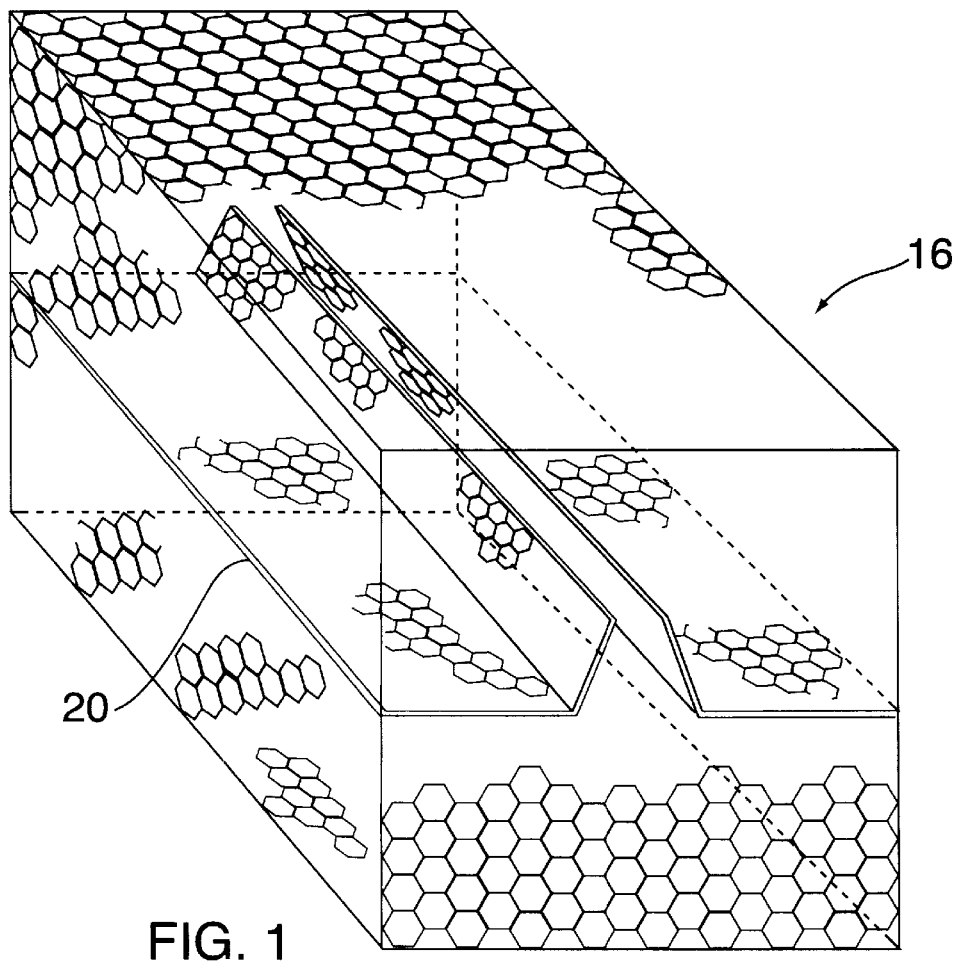
FIG. 1 is a partially cut-away pictorial representation of a crab trap of the type used for deploying nutrients in accordance with this invention.

In accordance with this invention, Calcium Carbonate in combination with other selected minerals, as more specifically describe in this specification, is mixed with selected chemical compounds derived from refined lanolin or fish oil or vegetable sources in approximately equal parts by volume. Refined lanolin, the preferred form for this invention, typically comprises approximately 35.4% esters of sterols and triterpene alcohols, 23.7% esters of aliphatic alcohols, 20.0% monohydroxyesters of sterols and of triterpene and aliphatic alcohols, 7.9% di- and polyhydroxyesters and free diols, 5.6% free aliphatic alcohols, 4.1% free sterols, 0.6% free hydrocarbons, 0.5% free fatty acids, and 2.2% unknowns.

Hydrated sea shells in powder form, which includes Calcium Carbonate, is a preferred combination of minerals for use in this invention. The powder preferably is formed by heating common oyster shells to a temperature within the range of 2000° F. to 2400° F. for at least five hours and then allowing the treated shells to cool to room temperature before mixing the dehydrated shells with low mineral content water such as rain water or well water in a liquid measure ratio of approximately three parts water to one part shells to cause an exothermic reaction that reduces the shells to a powder form when the water has been thoroughly absorbed. Preferably, the powdered minerals used in accordance with this invention will comprise, by weight, approximately 50% calcium, 0.1% phosphorus, 0.3% magnesium and 0.2% each of potassium and sodium.

It has been found that the mixture of calcium carbonate powder and chemical compound derived from refined lanolin or vegetable sources such as linseed oil, acts as a "facilitator", in brackish, fresh water or salt water, to encourage the growth of marine organisms, beginning with common Algae, which have been found to lead to the evolution of Amphipods that feed upon the Algae; these are in turn followed by Phytoplankton, that are themselves followed by Zoöplankton. It is known that the evolution of Phytoplankton and Zoöplankton under these circumstances, will be followed in normal course, by the evolution of barnacles, clams, mussels and the like.

It has been discovered that the latitude of exposure to daily sunlight and moonlight, and the length of daily exposure time to these parameters will have a serious effect on the efficacy of the desired evolutionary process. Ambient temperature and liquid flow past the exposed nutrient mix as affected by wind, wave and tidal activities, similarly provide additional enhancement of the evolutionary process. Preferably, the geographic latitude of a chosen environment, submerged liquid flow velocities at a depth not substantially in excess of eight feet, ambient temperature ranges, and the length of daily exposure time to these parameters should fall generally within the range of temperate zone conditions that prevail along the Central Atlantic coast of the United States at any time during a given year; desirable representative conditions occur typically at Stevensville, Md. in the vicinity of the Chesapeake Bay Bridge.

The nutrient paste mix formed, for example, of refined lanolin and calcium carbonate powder in accordance with this invention, is utilized to begin the process of husbanding marine growth, by coating it onto the surface of a suitable organic substrate support such as corn cobs or clam or oyster shells, and then submerging the coated substrate supports in an aqueous medium under the conditions herein disclosed. It has been found that submergence and subsequent desired growth are preferably facilitated by enclosing the coated substrate support materials in a confining "nutrient cage" and lowering the filled cage to the desired depth in the aqueous medium. Submergence of the filled nutrient cage may be accomplished desirably within the confines of a commercial-type crab pot. The "nutrient cage" may be most desirably formed of plastic coated wire with a mesh size on the order of one-inch square. The size of the crab pot allows positioning one or more wire mesh additional interior walls within a standard-sized two cubic-foot crab pot along with the nutrient cage, to provide additional surface area for evolutionary marine life growth as described in the following.

Figure 2:
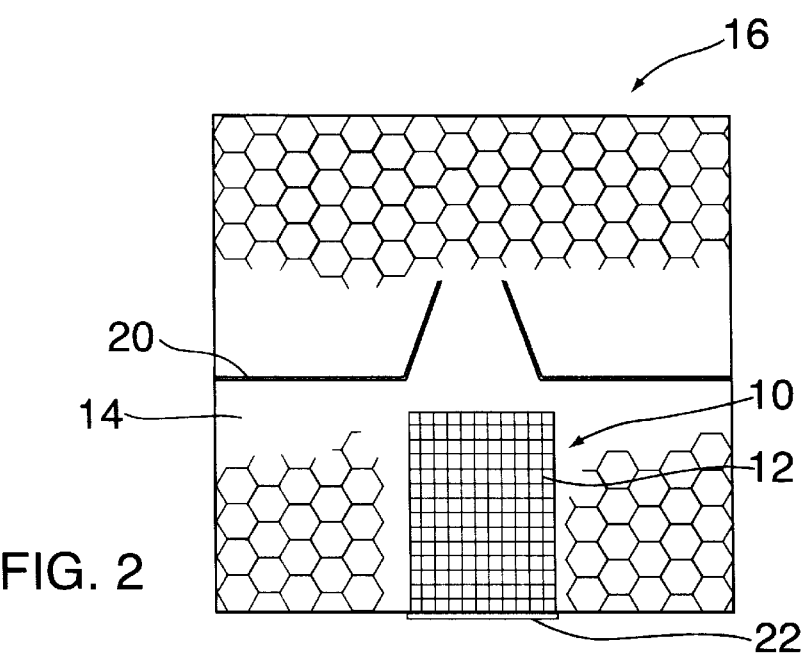
FIG. 2 is a partially cut-away side elevation view of the crab pot of FIG. 1 with an inserted nutrient cage for forming a marine-life environmental support structure in accordance with this invention.

The configuration of the wire mesh structure provides for maximum surface area exposure to water circulation and allows for substantially unimpeded liquid flow past the wire mesh structure in the direction of three orthogonal axes. The crab pot structure has been found to provide an environment that allows marine growth to adhere in an array that facilitates and enhances the proliferation of such growth in the most desirable manner. In FIG. 2 of the drawings, a nutrient cage 10 having a generally three dimensional rectangular or cylindrical shape 12 is shown enclosed within the lower portion 14 of a commercially available crab pot 16. Crab pot 16 may be provided with an opening having a movable cover 22 of know design to facilitate insertion and removal of cage 10. In FIG. 2 of the drawings, it can be seen that the wire mesh structure 18 of the cage 10 is of a substantially standard rectangular or square grid shape. It can for example, have a 1 inch square grid dimension. In the illustrated embodiment, a wire mesh interior wall 20 is positioned within crab pot 16 along with the nutrient cage 10. A common type of commercially available crab pot may enclose an interior volume of two cubic feet, and the interior walls 20 may be formed of the same wire mesh material as the outer walls of the pot. For such a crab pot, the nutrient cage typically may be in the form of a cylinder 10 inches tall and 4 inches in diameter. While the mesh shape of the pot commonly is 2 inch hexagon-shaped plastic coated wire mesh, the walls of the nutrient cage may be formed of plastic-coated wire mesh having a 1 inch square configuration. Although these specific shapes and forms have been illustrated, it should be understood that other shapes and forms of both the wire mesh and the cage as well as the crab pot, may be adopted within the scope of this invention.

It has further been found that plastic coated wire mesh is a preferred material for construction of both the nutrient cage and the walls of the crab pot; this material provides an advantageous surface for the attachment of evolving marine growth in submerged conditions of the type herein disclosed. In this regard, 18 gauge wire has been found to be a preferred construction material for the mesh.

It has also been found that nutrient cages prepared and placed in accordance with the processes and conditions herein disclosed, will, after approximately two weeks of submergence, develop a mucous-like growth disposed along portions of the structure of the cage. The mucous-like growth is believed to be directly attributable to the nutrient mix within the cage. In turn, the growth acts as an incubator and host that enhances, encourages and protects the activity of ecological opportunities that result in the evolution of zoo plankton and/or phytoplankton throughout the 12-month annual cycle in the conditions herein disclosed and described. Zooplankton appear to be more active at the lower end of the temperature range for these conditions, while phytoplankton appear to be more active as temperatures increase toward the upper end of the range.

Although specific embodiments of this invention have been described and illustrated herein, it will be obvious to those of skill in this art that various other fully equivalent embodiments consistent with the invention are possible and made evident within the scope of this disclosure.

What is claimed is:

1. A method of husbanding the evolution of marine organisms in an aqueous medium comprising the steps of:

combining a selected mineral mix and a selected chemical compound in substantially equal parts by volume to form a nutrient paste;

coating at least one side of a substrate support member with the said nutrient paste;

submerging the coated substrate support member in an aqueous medium at a selected depth not substantially in excess of ten feet below the surface thereof, in the presence of a life-form supporting structure having substantially all of its surface area exposed to substantially unrestricted media flow past said surface along at least three orthogonal axes;

exposing the surface of the aqueous medium to climatic conditions not substantially different from conditions prevailing along the Mid-Atlantic Coast of the United States, to allow the desired growth to occur.

2. A method of husbanding the evolution of marine organisms in accordance with claim 1, wherein:

said chemical compound is selected from the group consisting of fish oil, refined lanolin and linseed oil.

3. A method of husbanding the evolution of marine organisms in accordance with claim 1, wherein:

a plurality of the coated substrate support members are enclosed within a nutrient cage formed of plastic coated wire mesh, substantially filling the volume of said nutrient cage, prior to said submerging step.

4. A method of husbanding the evolution of marine organisms in accordance with claim 1, wherein:

said selected chemical compound is refined lanolin.

5. A method of husbanding the evolution of marine organisms in accordance with claim 4, wherein:

said refined lanolin comprises substantially 35.4% esters of sterols and triterpene alcohols, 23.7% esters of aliphatic alcohols, 20.0% monohydroxyesters of sterols and of triterpene and aliphatic alcohols, 7.9% di- and polyhydroxyesters and free diols, 5.6% free aliphatic alcohols, 4.1% free sterols, 0.6% free hydrocarbons, 0.5% free fatty adds, and 2.2% unknowns.

6. A method of husbanding the evolution of marine organisms in accordance with claim 1, wherein:

said selected chemical compound is linseed oil.

7. A method of husbanding the evolution of marine organisms in accordance with claim 1, wherein:

the said selected mineral mix is derived from hydrated oyster shells in powder form comprising by weight, substantially 50% calcium, 0.1% phosphorus, 0.3% magnesium and 0.2% each of potassium and sodium.

8. A method of husbanding the evolution of marine organisms in accordance with claim 7, wherein:

said hydrated oyster shells are formed from oyster shells by heating said oyster shells to a temperature within the range of 2000° F. to 2400° F. for at least five hours to dehydrate them and then mixing the dehydrated shells with low mineral content water in a liquid measure ratio of approximately three parts water to one part powder, to cause an exothermic reaction that reduces the shells to a powder form when the water has been thoroughly absorbed.

9. A method of husbanding the evolution of marine organisms in accordance with claim 1, wherein:

said substrate support member is selected from the group consisting of oyster shells and corn cobs.

10. A method of husbanding the evolution of marine organisms in accordance with claim 1, wherein:
said life-form supporting structure is formed of plastic coated wire mesh.

11. A method of husbanding the evolution of marine organisms in accordance with claim 10, wherein:
the wire forming said wire mesh is substantially of 18 gauge.

12. A method of husbanding the evolution of marine organisms in accordance with claim 1, wherein:
said coated substrate support member is enclosed within a nutrient cage having walls formed of plastic coated wire mesh, for the submerging step.

13. A method of husbanding the evolution of marine organisms in accordance with claim 12, wherein:
the submersion step is carried out with said nutrient cage enclosed within a crab pot structure to provide protection for life-forms supported on said supporting structure.

14. A method of husbanding the evolution of marine organisms in accordance with claim 13, wherein:
said crab pot structure incorporates walls formed of plastic coated wire mesh, and said life form supporting structure is defined by said wire mesh.

15. A method of husbanding the evolution of marine organisms in accordance with claim 14, wherein:
said life-form supporting structure is embodied in the wire mesh walls of both said nutrient cage and said crab pot structure;
the submersion step is carried out with a plurality of life-form supporting structures enclosed within a given crab pot structure to provide protection for life-forms supported on said supporting structures.

16. A method of husbanding the evolution of marine organisms in accordance with claim 12, wherein:
said life-form supporting structure is embodied in the wire mesh walls of said nutrient cage.

17. A method of husbanding the evolution of marine organisms in accordance with claim 16, wherein:
additional life-form supporting structure is provided by inserting dividing walls formed of plastic coated wire mesh within said crab pot structure.

18. A method of husbanding the evolution of marine organisms in accordance with claim 12, wherein:
said nutrient cage is filled with substantially as many coated substrate support members as will fit within its confines, for the submersion step.

* * * * *